O. C. SIBILSKY.
MILKING MACHINE.
APPLICATION FILED APR. 30, 1912.
1,036,355.
Patented Aug. 20, 1912.
3 SHEETS—SHEET 1.
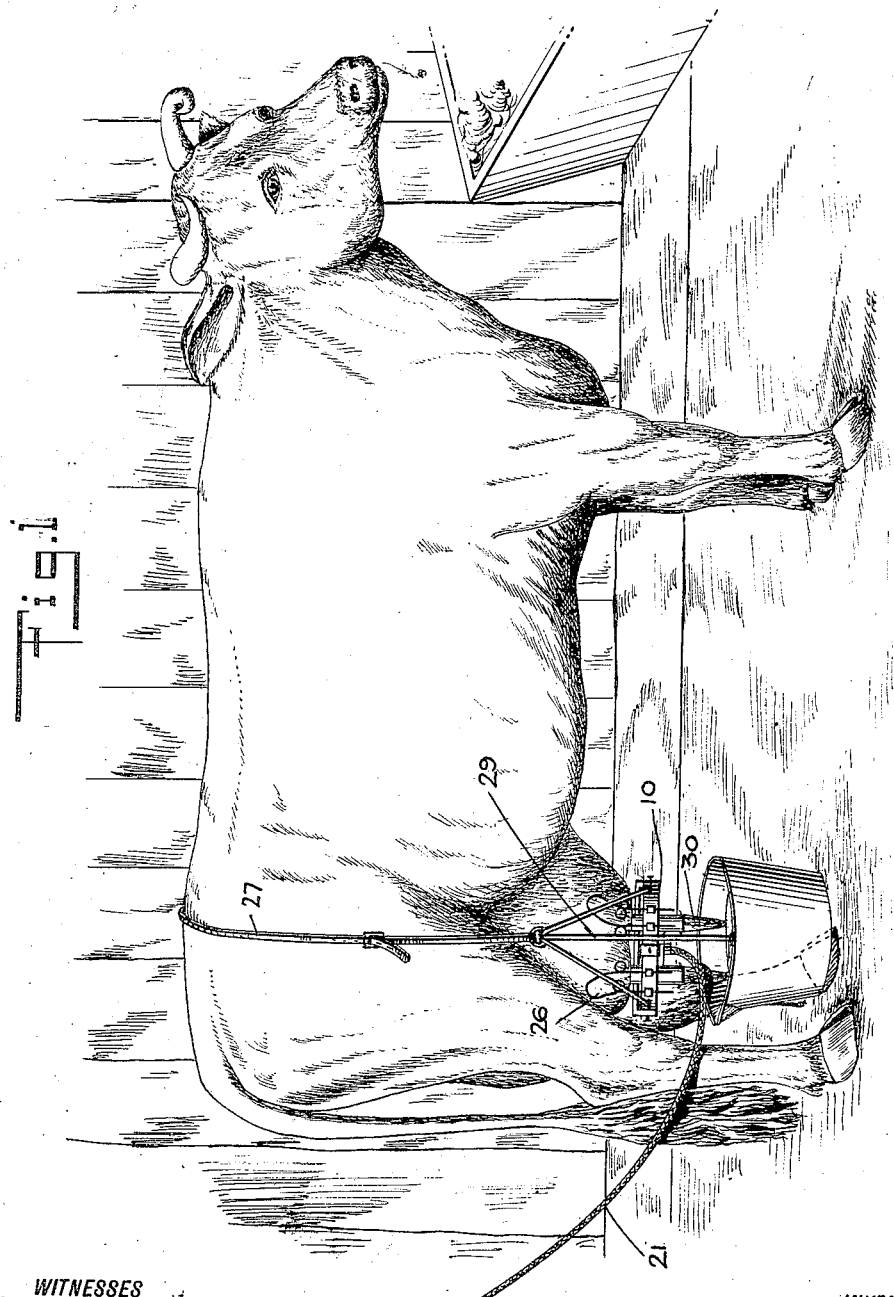
WITNESSES
INVENTOR
Otto C. Sibilsky
BY
ATTORNEYS

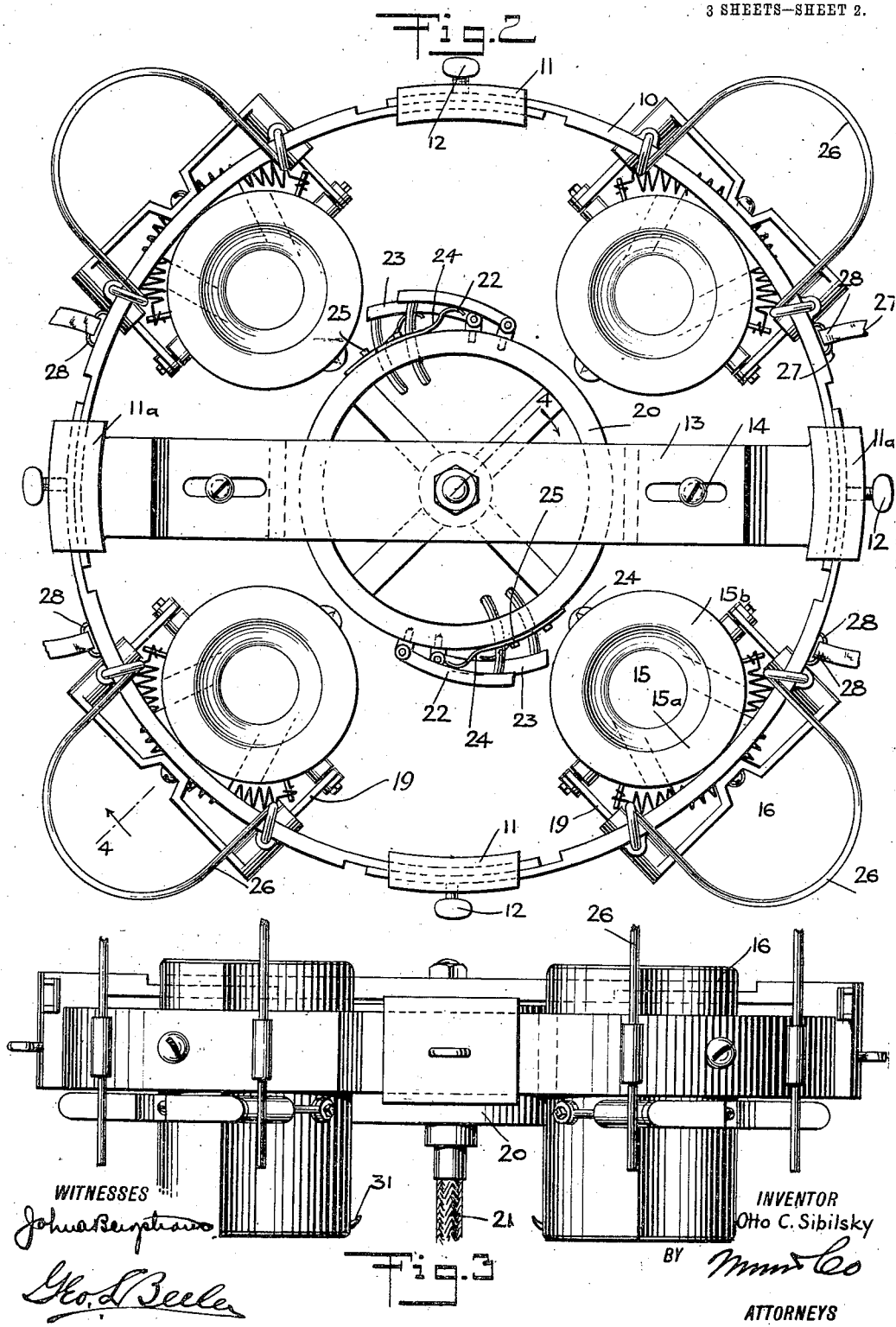

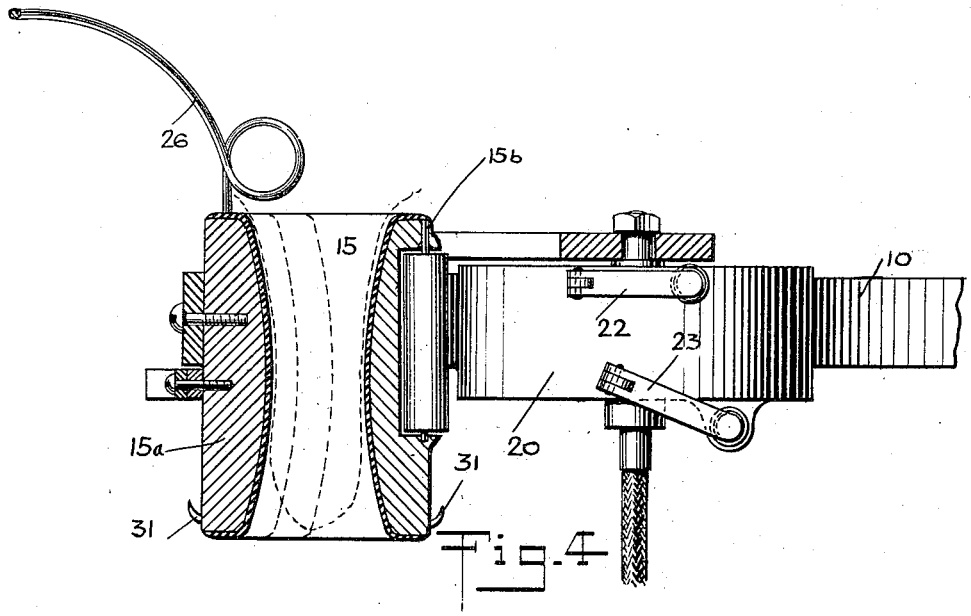
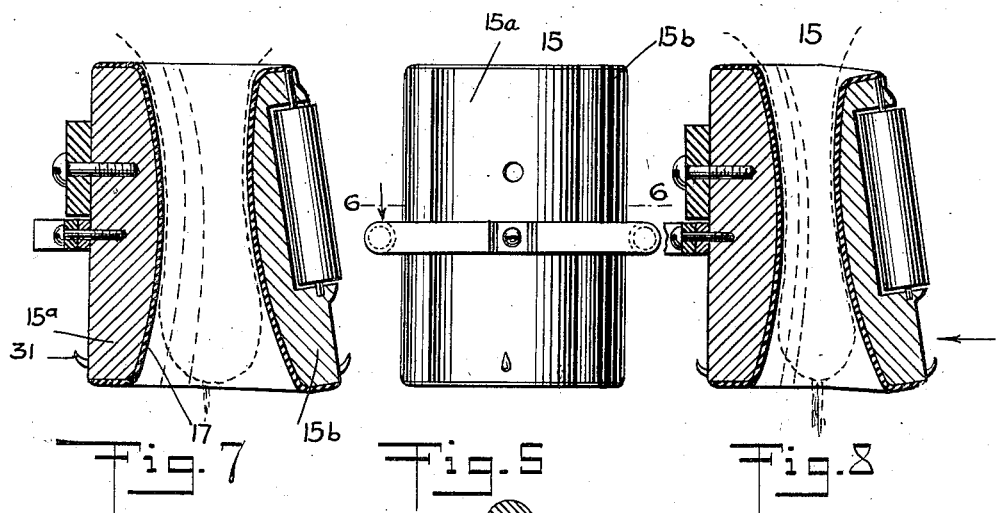
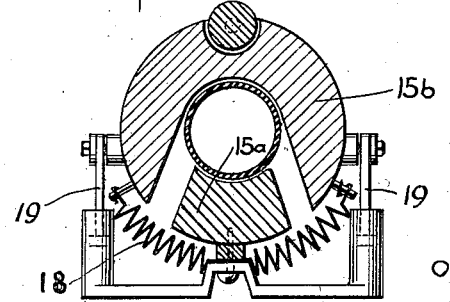

UNITED STATES PATENT OFFICE.

OTTO C. SIBILSKY, OF ALGOMA, WISCONSIN.

MILKING-MACHINE.

1,036,355.

Specification of Letters Patent. Patented Aug. 20, 1912.

Application filed April 30, 1912. Serial No. 694,062.

*To all whom it may concern:*

Be it known that I, OTTO C. SIBILSKY, a citizen of the United States, and a resident of Algoma, in the county of Kewaunee and State of Wisconsin, have invented a new and Improved Milking-Machine, of which the following is a full, clear, and exact description.

This invention relates to dairy apparatus, and has particular reference to that type of devices known as milking machines or mechanical milkers.

Among the objects of this invention are: to provide a machine of the class indicated which will cause the milking operation to be performed by compression rather than by suction or stripping; to provide a device adjustable so as to accommodate it for use in connection with different size cows or those having different size udders; to provide an actuator for the milker which is adjustable in accordance with the size of the teats; and to provide a milking machine in which the compression cups are formed and operated so as to simulate the form and operation of a person's hand in hand milking.

The foregoing and other objects of the invention are accomplished in a preferred embodiment of the invention by means of the mechanism hereinafter fully described and claimed and illustrated in the accompanying drawings, in which—

Figure 1 is a representation of one of my machines in actual use; Fig. 2 is a plan view of the machine; Fig. 3 is a side elevation of the same; Fig. 4 is a sectional detail on the line 4—4 of Fig. 2; Fig. 5 is an outside elevation of one of the compression cups; Fig. 6 is a transverse section on the line 6—6 of Fig. 5; and Figs. 7 and 8 are vertical sections showing different positions of the movable member of the cup.

This invention comprises a frame 10 of any suitable curved form, shown as comprising a plurality of sections adjustably connected each to each by means of clamps 11 and set screws 12. Extending diametrically across the frame 10 is a support 13, likewise composed of a series of sections connected by means of screws 14, and the outer ends of said cross bar are preferably connected to clamps 11ª of the frame. A compression cup 15 is supported by each of said frame sections, as by means of a screw 16.

Each of said cups is substantially tubular and comprises a fixed section 15ª and a movable section 15ᵇ provided with a roller in its outer face, said fixed section having a substantially rigid connection with the frame 10 as aforesaid. The bore or inner surface of the cup 15 is provided with a soft lining 17, preferably composed of rubber and for the purpose of protecting the teat to be operated upon thereby, and to prevent the same from slipping out of place. The normal tendency of said lining 17 is to cause the two sections of the cup to approach each other, but said tendency of the lining is counteracted by a spring 18 on the outside tending to force them apart. The two cup members are pivoted together on the sides by means of slides 19, each comprising a plunger pivotally connected to one of said members for the purpose of permitting a rolling action of the cup in operation and yet the form and arrangement of the hinge are such that the movable member of the cup will have a lateral swing in addition to said rolling movement.

Connected to the cross bar 13 is an actuator 20, the same being journaled for rotation upon the cross bar and adapted to be driven by any suitable means, as for instance, a flexible shaft 21 driven from any suitable source of power. The actuator 20 consists of a wheel or cylindrical body having upon its periphery a plurality of sets of spring-pressed cams 22 and 23. The cam 22 is placed above and slightly in advance of the companion cam 23, the cams being adapted to operate successively upon the movable cup member 15ᵇ when the actuator is caused to rotate in the direction indicated by the arrow in Fig. 2. By virtue of this arrangement the cam 22 causes the upper end of the member 15ᵇ to press the teat at its upper end or root, and then, not releasing such compression, providing that the companion cam 23 will continue such compression progressively downward, simulating the action of a man's hand in milking. Furthermore, the lower cam 23 is set at an inclination to the plane of the actuator so as to more completely carry out the result above indicated and through the rolling motion of the movable cup member 15ᵇ. The cams 22 and 23 are thrust normally outward radially of the actuator by means of springs 24, and the effective operative position of the same may be varied through the adjustment nuts 25 in order to adjust the same to the size of the teats or the hardness of the milking in each case.

The frame 10 is adapted to be held in proper position on the cow's udder by means of a series of spring loops 26 connected to the respective sections of said frame, as indicated especially in Figs. 2 and 3. Furthermore, the entire machine is adapted to be supported in operative position by means of a strap 27 over the cow's hips and having branches connected to the frame at 28, such straps, of course, being adjustable to suit the size of the cow. The pail for the milk may also be suspended from the same strap 27, if desired, as by means of connections 29. The milk from the cups is adapted to be kept sanitary and to be directed therefrom into the pail by means of spouts 30 suspended or hooked upon the lower ends of the cups as at 31.

The several parts of this machine may be constructed of any suitable materials according to the purpose thereof, and the relative sizes and proportions of the same may be varied to considerable extent without departing from the spirit of the invention.

Having thus described my invention, what I claim as new and desire to secure by Letters Patent is:—

1. In a milking machine, the combination of a frame, a plurality of compression cups, each of said cups being of tubular form and comprising relatively fixed and movable sections, said sections being connected along two edges by a slide, a spring tending to separate said sections, and an actuator adapted to operate successively upon the opposite ends of said movable cup section against the tension of said spring.

2. In a milking machine, the combination of a frame, a series of compression cups carried by said frame, each of said cups being substantially tubular and comprising relatively fixed and movable sections, a flexible lining for said cups tending to contract the same, a spring tending to separate the cup sections in opposition to said lining, and an actuator including a pair of cams adapted to successively operate upon the opposite ends of said movable cup section.

3. In a milking machine, the combination of a frame, a series of compression cups connected to and carried by said frame, and an actuator coöperating with said cups and comprising a cylindrical body and a pair of cams pivoted thereto and adapted to operate successively upon the upper and lower ends of the cups, one of said cams being disposed at an angle to the plane of the other substantially as set forth.

4. In a milking machine, the combination of a frame, a plurality of compression cups carried thereby, a wheel pivoted for rotation in said frame, and a plurality of cams movably connected to the periphery of the wheel, said cams being adapted to operate successively upon the cups, one of the cams being inclined at an angle to the plane of rotation of the wheel.

5. In a milking machine, the combination of a frame including a cross bar, a series of compression cups carried by the frame, an actuator comprising a wheel journaled on said cross bar, and a pair of cams pivotally and radially adjustably connected to the periphery of said wheel, said cams being adapted to coöperate successively upon said cups.

6. In a milking machine, the combination of a frame comprising a series of adjustably connected sections and a cross bar comprising adjustably connected sections, a series of compression cups carried by said frame and comprising relatively fixed and movable sections, the fixed sections being connected respectively to the aforesaid frame sections, an actuator comprising a wheel journaled for rotation on said cross bar, and a set of cams carried thereby and adapted to operate successively upon the movable cup sections tending to move the same toward the fixed sections in a combined rolling and slide movement.

In testimony whereof I have signed my name to this specification in the presence of two subscribing witnesses.

OTTO C. SIBILSKY.

Witnesses:
LOUIS J. SIBILSKY,
WALTER E. SIBILSKY.

---

Copies of this patent may be obtained for five cents each, by addressing the "Commissioner of Patents, Washington, D. C."